(12) United States Patent
Zappe

(10) Patent No.: US 8,167,350 B1
(45) Date of Patent: May 1, 2012

(54) LINER APPARATUS AND METHOD OF MAKING A LINER

(76) Inventor: Raymond Zappe, Phoenix, AZ (US)

(*) Notice: Subject to any disclaimer, the term of this patent is extended or adjusted under 35 U.S.C. 154(b) by 1408 days.

(21) Appl. No.: 11/259,876

(22) Filed: Oct. 26, 2005

Related U.S. Application Data

(63) Continuation of application No. 10/077,346, filed on Feb. 14, 2002, now abandoned.

(51) Int. Cl.
B60R 13/01 (2006.01)

(52) U.S. Cl. .................................... 296/39.1

(58) Field of Classification Search .............. 296/39.1, 296/39.2; 428/98–220
See application file for complete search history.

(56) References Cited

U.S. PATENT DOCUMENTS

| | | | | |
|---|---|---|---|---|
| 3,452,861 A * | 7/1969 | Erwin | ............................ | 206/389 |
| 4,098,184 A * | 7/1978 | Okada et al. | ..................... | 101/41 |
| 4,645,556 A * | 2/1987 | Waugh et al. | .................. | 156/242 |
| 5,083,830 A * | 1/1992 | Mucher et al. | ............... | 296/39.2 |
| 5,468,532 A * | 11/1995 | Ho et al. | ......................... | 428/40.9 |
| 5,806,909 A * | 9/1998 | Wise | ............................. | 296/39.1 |
| 5,968,657 A * | 10/1999 | Scullin et al. | ............... | 428/423.1 |
| 6,083,335 A * | 7/2000 | Scullin et al. | ................. | 156/196 |
| 6,103,390 A * | 8/2000 | Kamiya et al. | ............. | 428/542.2 |
| 6,254,712 B1 * | 7/2001 | Enlow et al. | ............. | 156/244.11 |
| 6,350,509 B1 * | 2/2002 | Sada et al. | ...................... | 428/212 |
| 6,551,432 B1 * | 4/2003 | Spain et al. | .................... | 156/230 |
| 6,773,804 B2 * | 8/2004 | Enlow et al. | ................... | 428/327 |
| 7,611,772 B2 * | 11/2009 | Barancyk et al. | .......... | 428/423.1 |
| 7,968,197 B2 * | 6/2011 | Barancyk et al. | .......... | 428/423.1 |
| 7,968,198 B2 * | 6/2011 | Barancyk et al. | .......... | 428/423.1 |
| 7,972,701 B2 * | 7/2011 | Martz et al. | ................ | 428/425.8 |
| 2004/0105154 A1 * | 6/2004 | Luong et al. | ..................... | 359/529 |
| 2004/0209057 A1 * | 10/2004 | Enlow et al. | ................... | 428/220 |
| 2005/0136221 A1 * | 6/2005 | Fabick, Jr. | ..................... | 428/156 |
| 2006/0068198 A1 * | 3/2006 | Bratys et al. | .................. | 428/337 |
| 2007/0048504 A1 * | 3/2007 | DiMario | .................... | 428/195.1 |
| 2008/0113148 A1 * | 5/2008 | Enlow et al. | ..................... | 428/98 |

FOREIGN PATENT DOCUMENTS

WO   WO 9403337 A2 *   2/1994

\* cited by examiner

*Primary Examiner* — H Gutman

(74) *Attorney, Agent, or Firm* — H. Gordon Shields

(57) ABSTRACT

A liner for a cargo area of a vehicle, such as a car, truck, trailer, or the like, includes at least three layers, a base layer, an intermediate patterned layer, and a clear or transparent top layer so that the patterned layer may be viewed. The patterned layer may be monochromatic, where only a single color is used, or it may be polychromatic, where several colors are used. The patterned layer may be a color scape, a design or logo, a message, or any decorative item. Three embodiments of methods for making a liner are shown. The methods include the use of a female mold, a male mold, or a combination of male and female molds where the male mold is a ram applying pressure and heat to the several layers on the female mold.

7 Claims, 2 Drawing Sheets

LINER APPARATUS AND METHOD OF MAKING A LINER

This application is a continuation application of application Ser. No. 10/077,346, filed Feb. 14, 2002 now abandoned.

BACKGROUND OF THE INVENTION

1. Field of the Invention

This invention relates to liners, and more particularly, to liners for the cargo area of vehicles and to methods of making liners.

2. Description of the Prior Art

Cargo area liners, such as bed liners for trucks, of the prior art are generally of two kinds, bed liners which are molded and put in place in or on the bed of a truck, and bed liners which are sprayed on the truck bed and essentially become integral with the bed.

For the bed liners which are pre-molded, they have but a single thickness or layer, and the single layer is essentially homogeneous. The bed liners must, of course, be molded to fit the particular make and model vehicle for which they are designed. Included in the molding typically is the name of the maker of the bed liner, whether an independent company or a vehicle manufacturer when the bed liner comes with the vehicle.

The apparatus and method of the present invention comprises a multilayer molded liner, as a bed liner for a vehicle or a liner for a cargo area having at least a single clear or transparent top layer, with a lower layer beneath the clear layer having a pattern of some type, such as a design, wording, logo, etc., which shows through the clear layer and which may be viewed through the clear or transparent layer. Typically, there will be three layers, including a base layer, a patterned layer, and a clear or transparent layer.

SUMMARY OF THE INVENTION

The invention described and claimed herein comprises a molded liner for cargo areas and the like having a plurality of layers including a top clear or transparent layer and a layer directly below or underneath the clear layer which may include an appropriate pattern or notation, such as a design, logo, brand name, message, or the like. The pattern or notation layer may include colors or it may be monochromatic and it is placed directly on and against a base layer. A method of making such a bedliner is also disclosed, with four embodiments described and claimed. The embodiments include using a female mold and spraying three layers, using a male mold and spraying three layers in the reverse fashion from that using a female mold, using a female mold and spraying a base coat and adding a film coat and adding a final film coat with pressure applied. A bottom mold and a top mold are required for the latter. A fourth embodiment also uses both a top and a bottom mold and the use of heat and air (pneumatic) pressure.

Among the objects of the present invention are the following:

To provide a new and useful liner for a cargo area;
To provide a new and useful bed liner for a vehicle;
To provide a new and useful liner having a plurality of layers;
To provide a new and useful truck bed liner having a plurality of layers and including a clear top coat directly on a patterned layer;
To provide a new and useful method of making a truck bed liner;
To provide a new and useful method of spraying a bed liner having a plurality of layers;
To provide a new and useful method of molding a bed liner;
To provide a new and useful method of making a bed liner including spraying and molding steps; and
To provide a new and useful method of making a bed liner having a patterned layer and a transparent layer over the patterned layer for observation by a viewer.

DESCRIPTION OF THE PREFERRED EMBODIMENT

Figure 1:
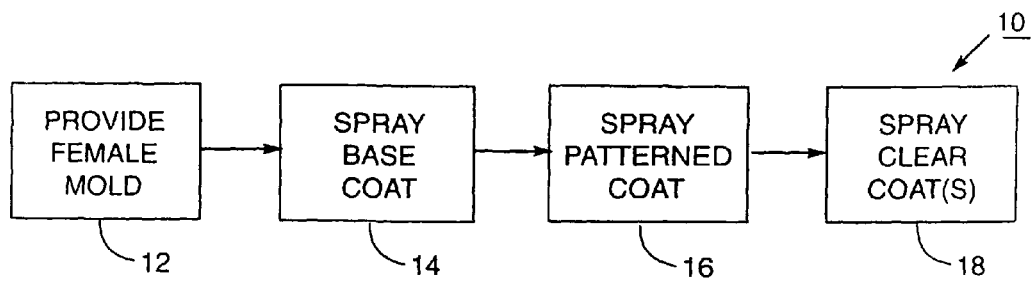
FIG. 1 is a block diagram schematically illustrating a method of making a bed liner of the present invention.

FIG. 1 is a block diagram schematically illustrating a method 10 of making a liner for a cargo area, and for explanatory purposes, a bed liner for a truck, trailer, etc., using a female mold, is discussed. The method 10 is the simplest method, involving essentially four steps, including a first step 12 of providing a female mold. Since virtually each make and model vehicle is different from every other make and model, numerous molds will be provided, or at least a number of molds consistent with the decision of the maker as to what liners will be produced. Accordingly, a female mold will accurately reflect the contour of a particular bed or cargo area. Typically, a liner will include at least three layers, and the layers are preferably comprised of appropriate plastics or polymers which may be conveniently sprayed onto a mold and onto each other. That is, a first coat is sprayed onto a mold, and the second and third coats or layers are subsequently sprayed over or on the preceding coat or layer.

A second step 14 of spraying a base coat or layer includes the step of appropriately applying, such as by spraying, a release agent into the female mold prior to spraying the base coat or layer. After the base coat is sprayed, the coat is appropriately cured prior to spraying the second coat.

A third step 16 includes spraying a patterned coating or layer directly on and against the base layer. The patterned coat may include several discrete steps, depending on the particular pattern included. That is, a polychromatic layer will of necessity include several different sprays over a desired pattern, while a monochromatic coat may require only one spray step. Appropriate curing is also required after the coat is applied. For polychromatic coats, there may be curing times or steps between each color.

A fourth step 18 includes spraying a clear or transparent coat or layer directly on the patterned layer. This third layer, or top coat, allows the pattern to be observed or viewed and protects the pattern. Again, curing of the coat is required. After curing, the liner is removed from the mold and may then be placed in a bed, or stacked for later transporting and installation.

It will be noted that more than one clear top coat may be applied, if desired One coat may be sufficient for most situations, but two or more coats may be desirable to provide the most advantageous clear layer in other situations.

Figure 2:
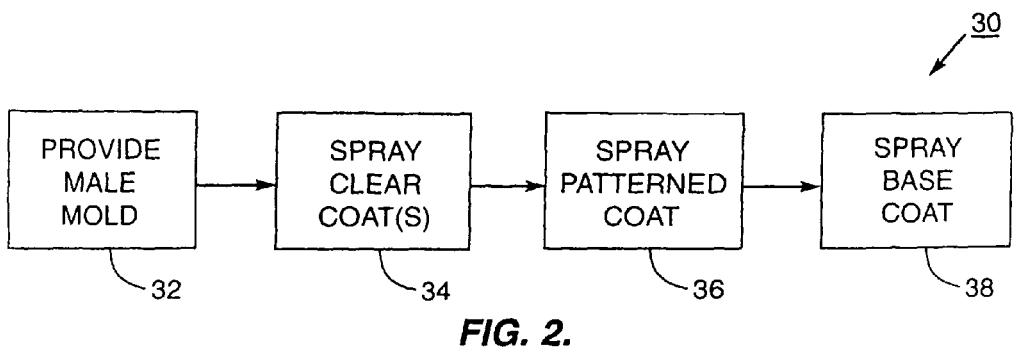
FIG. 2 is a block diagram schematically illustrating an alternate embodiment of the present invention.

FIG. 2 is a block diagram schematically illustrating an alternate embodiment of the method 10 of FIG. 1. FIG. 2 illustrates a method 30 involving the use of a male mold. The method 30 is essentially the reverse of method 10. Like method 10, method 30 involves spraying polymers, but unlike method 10, method 30 sprays polymer coats in reverse, using a male mold instead of a female mold.

A first step 32 comprises the step of providing a male mold. This step includes the provision of a male mold or molds in accordance with the makes and models of liners desired.

A second step 34 comprises the step of spraying a clear or transparent coat on the male mold. The step 34 includes the step of applying (spraying) a release agent on the male mold prior to the first coat or layer, which is the clear coat or layer.

Next comes step 36, the third step, which comprises applying a patterned coat directly on the clear coat. Like step 16, step 36 may include a polychromatic coat, necessitating several separate spray coats, each with a different color, or a single monochromatic coat may be applied, as desired.

The final, fourth, step comprises step 38, applying (spraying) a base coat directly on and against, the patterned layer. The base coat is applied last because a male mold is used.

Implied in the several steps is, of course, the curing of each coat or layer prior to applying the next coat, and the removal of the liner from the mold after the final coat or layer is applied and cured.

For both methods 10 and 30, the base coating or layer is typically a foam layer, with the desired elastic properties and with the ability to conform to the contours of the vehicle on or in which the finished liner will be installed.

Figure 3:
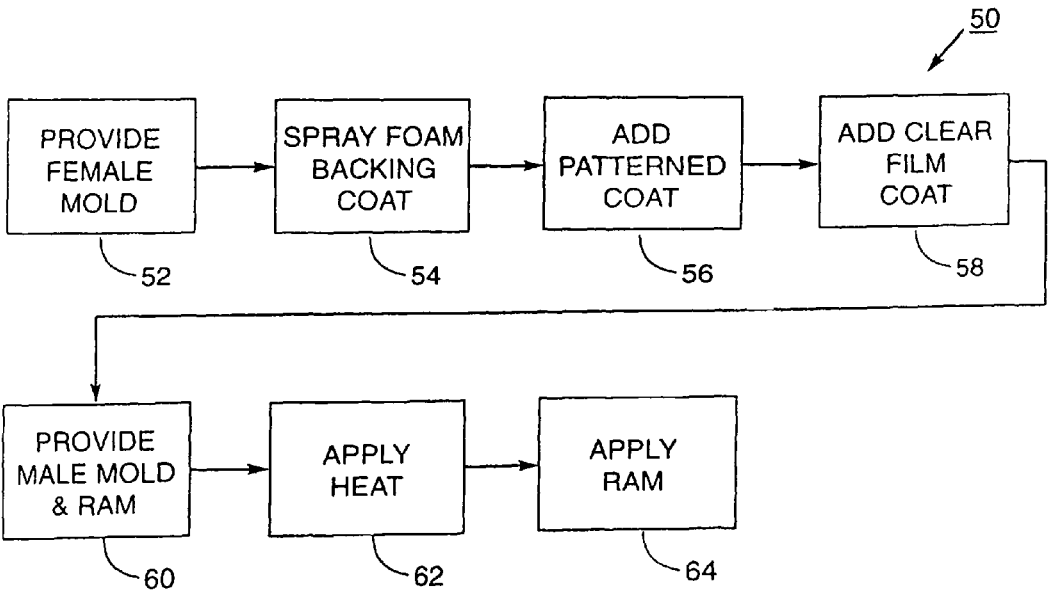
FIG. 3 is a block diagram schematically illustrating another alternate embodiment of the present invention.

FIG. 3 is a block diagram schematically illustrating a third method of making a liner, comprising method 50. Method 50 is more complex than methods 10 and 30 because a pair of molds, an upper mold and a lower mold, is used, along with appropriate heat and pressure. The upper mold includes a ram.

Step 52, the first step, comprises the providing of a female mold for the desired bed liner. The female mold is, of course, a lower mold. Step 54, the second step, comprises the spraying of a base coat or layer on the lower, female mold. Along with the base coat, as stated above, is the provision of an appropriate release agent to the mold prior to the spraying of the base coat. The base coat is a foam layer which takes up the voids and conforms to the configuration of the desired make and model vehicle.

Step 56, the third step, comprises adding the desired patterned coat, either by paint or film, directly on the base layer, as indicated above. The use of double molds and a clear film coat or layer, provides more flexibility in the choice of a patterned coat. Accordingly, the patterned coat may be painted on the base coat or an appropriately patterned film coat may be applied, as desired.

Step 58, the fourth step, comprises adding an outer clear film coat or layer directly on or over the patterned coat. The clear film coat is added on the patterned coat and is loosely placed on the lower mold. Step 60, the fifth step, indicates that the upper mold is then provided or added to the lower mold. The upper mold includes a ram. The upper mold also secures the film coat or layer to the lower mold. The female mold is, of course, the lower mold, as stated above. The ram is essentially a movable male mold that conforms to the configuration of the lower, female mold and to the layers or coats of the liner, as will be apparent from further discussion, below.

Heat is added in the sixth step 62 to stretch the film layer in order for the film layer to conform to the configuration of the two coats or layers already on the mold. Heat may be added as appropriate, as by a radiant heater or by hot air, as discussed below in conjunction with FIG. 4, a fourth embodiment of the present invention. The ram is moved against the film coat or layer in step 64 to move the stretched film layer against the patterned coat. Pressure is applied by the ram against the film coat and, of course, against the patterned and base coats, to secure the film coat to the patterned coat as the final step. As with the above discussed methods 10 and 30, appropriate curing is required as part of the various steps.

After curing, the upper mold, with the ram, is lifted off the liner and the liner is removed from the lower, female mold.

If desired, an additional layer or layers may be provided in each of the methods discussed above. The number and thickness of each layer depends on the qualities desired for the end product. The outer layer or layers in each case is/are clear or transparent to allow the patterned layer or coat to be viewed. The patterned layer is decorative, but also provides a functional aspect for the bed liner, namely an extra layer of protection for the vehicle on which the bed liner is installed.

Figure 4:
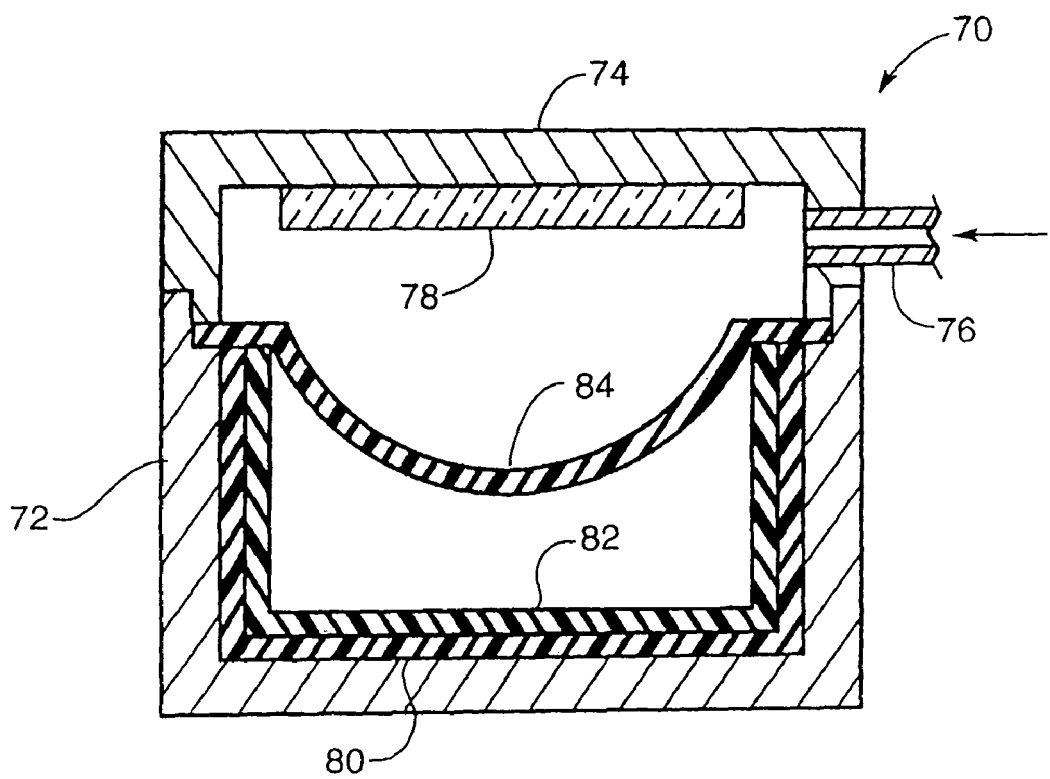
FIG. 4 is a schematic representation in partial section of an alternate embodiment of the method of FIG. 3.

FIG. 4 is a view in partial section schematically representing an alternate embodiment of method 50 of FIG. 3, and comprising a view in partial section through a mold apparatus 70. The mold apparatus 70 includes a lower mold 72 and an upper mold 74. The first few steps involved with the apparatus 70 are essentially the same as the steps 52 through 58 discussed above. The final steps then deviate from the steps of method 50.

Within the lower mold 72 is a first, preferably foam coat or layer 80, which is a bottom or base layer. The layer 80 includes a release agent which is sprayed in the mold 72 prior to the spraying of the bottom or base coat or layer 80.

After the coat 80 is cured, a decorative, or patterned, coat or layer 82 is sprayed directly on the coat or layer 80. The decorative layer 82 is then cured.

After the layer 82 is cured, a clear film layer 84 is placed across the top of the lower mold 72. The upper mold 74 is then placed on the lower mold 72 in a sealing engagement. Heat is then added above the film layer or coat 84 to heat the film to about two hundred fifty degrees F. in order to stretch the film layer 84. The heat can be from hot air flowing into the mold 74 through a nozzle 76, or from a radiant heater 78, or the like. Whatever the source of the heat, the film layer 84 stretches and under pneumatic pressure from air through the nozzle 76, the film layer 84 moves downwardly directly against the patterned coat or layer 82. The clear film layer 84 then cures and the finished liner may then be removed from the mold. The upper mold 74 is, of course, removed in order to remove the finished liner.

If radiant heat from the heater 78 is used to heat the film layer or coat 84, the pressurized air through the nozzle 76 need not be heated. If heated air is introduced to stretch the clear film layer 84, then there is no need for the radiant heater 78. Typically, the air pressure, heated or ambient air, is about thirty psig (pounds per square inch gage).

Different types of plastic materials may be used for the various coats or layers discussed above. The base layer may be polyurethane or polyurethane foam, or it may be fiberglass, rubber, an impregnated asphalt fabric or product, or other appropriate plastic or polymer material.

The patterned layer may be an aliphatic polyurethane product, or polyester film, or other appropriate film. The top or outer clear layer may likewise be a polyester or Mylar product or other appropriate plastic product. It will be noted that the same plastic for the patterned and outer layers may be either in liquid form for spraying, as discussed for the methods 10 and 30, or in film form, as discussed for the method 50.

The outer, clear layer in each method includes appropriate ultra violet radiation protection material. This insures maximum life for the bed liner with minimum deterioration due to solar radiation.

In addition to ultra violet protection, chemical, abrasion, and weather resistance protection is also required. The plastics, or polymers, are appropriately chosen to provide the desired degree of protection or resistance. This is so whether the polymer layers are sprayed or whether they are layed up as film layers. Moreover, the various coats or layers must be able to bond to each other to provide essentially a unitary end product.

The various coats may be either relatively flexible or relatively inflexible, depending on the desired end use. That is, the bed liner may flex or it may not flex. In some cases, a relatively inflexible bed liner, with a high modulus of flexibility, may be advantageous and in other cases a relatively flexible bed liner, with a low modulus of flexibility, may be advantageous. The term "flex" is used in its ordinary sense as understood by those skilled in the art. The term "relatively" is also used in its ordinary sense as understood by those skilled in the art.

There are different styles of liners. For example, a typical bed liner for a pickup truck includes a bottom or floor, a front (cab) wall, and two side walls. The side walls may be vertical panels only or they may include a top rail, pair of panels which cover the top side surfaces of a truck sides. Moreover, a cover for the tailgate of a truck is typically included as part of a bed liner. On the other hand, a unitary, one piece liner for a cargo area, such as the trunk of a car or van or the like, may also be fabricated, in which a short rear wall is integral with the adjacent short side walls and the bottom wall. Such a liner may be applicable for a truck or trailer when no tailgate is involved, but rather when the cargo area of the vehicle includes four relatively solid walls. Obviously, the above described methods are applicable to any desired type or configuration of vehicle liner or bed liner. The thickness of the various layers or coats may be as desired or as appropriate for the end use of the liner.

The present invention has been discussed in terms of a liner for a vehicle cargo area, but there may also be other adaptations for the invention, such as for a hot tub, spa, etc., where a patterned layer beneath a clear layer is desired.

While the principles of the invention have been made clear in illustrative embodiments, without departing from those principles there may occur to those skilled in the art modifications of structure, arrangement, proportions, the elements, materials, and components used in the practice of the invention, or otherwise, which are particularly adapted to specific environments and operative requirements. The appended claims are intended to cover and embrace any and all such modifications within the limits only of the true spirit and scope of the invention.

What I claim is:

1. A bed liner for the cargo area of a vehicle comprising in combination:
   a base layer disposed on the bed of a vehicle;
   a polychromatic patterned second layer directly on and against and secured to the base layer; and
   a clear third layer directly on and against and secured to the polychromatic patterned layer for permitting the polychromatic patterned layer to be viewed.

2. The liner of claim 1 which includes a clear fourth layer on the clear third layer.

3. A liner for the cargo area of a vehicle consisting of:
   a first layer defining a base layer;
   a patterned second layer disposed directly on and secured to the first layer;
   a clear third layer disposed directly on and secured to the patterned layer for allowing the patterned layer to be viewed.

4. The liner of claim 3 in which the clear layer provides ultra violet protection.

5. The liner of claim 3 in which the clear layer is sprayed on the patterned layer.

6. The liner of claim 3 in which the clear layer is a film layer disposed on and against the patterned layer.

7. The liner of claim 3 in which the clear layer includes a plurality of coats.

* * * * *